Dec. 5, 1967   J. W. HENDRY   3,355,765
PELLETIZING MACHINE
Filed Sept. 2, 1965   2 Sheets-Sheet 1

INVENTOR.
JAMES W. HENDRY
BY
Woodhams, Blanchard and Flynn
ATTORNEYS

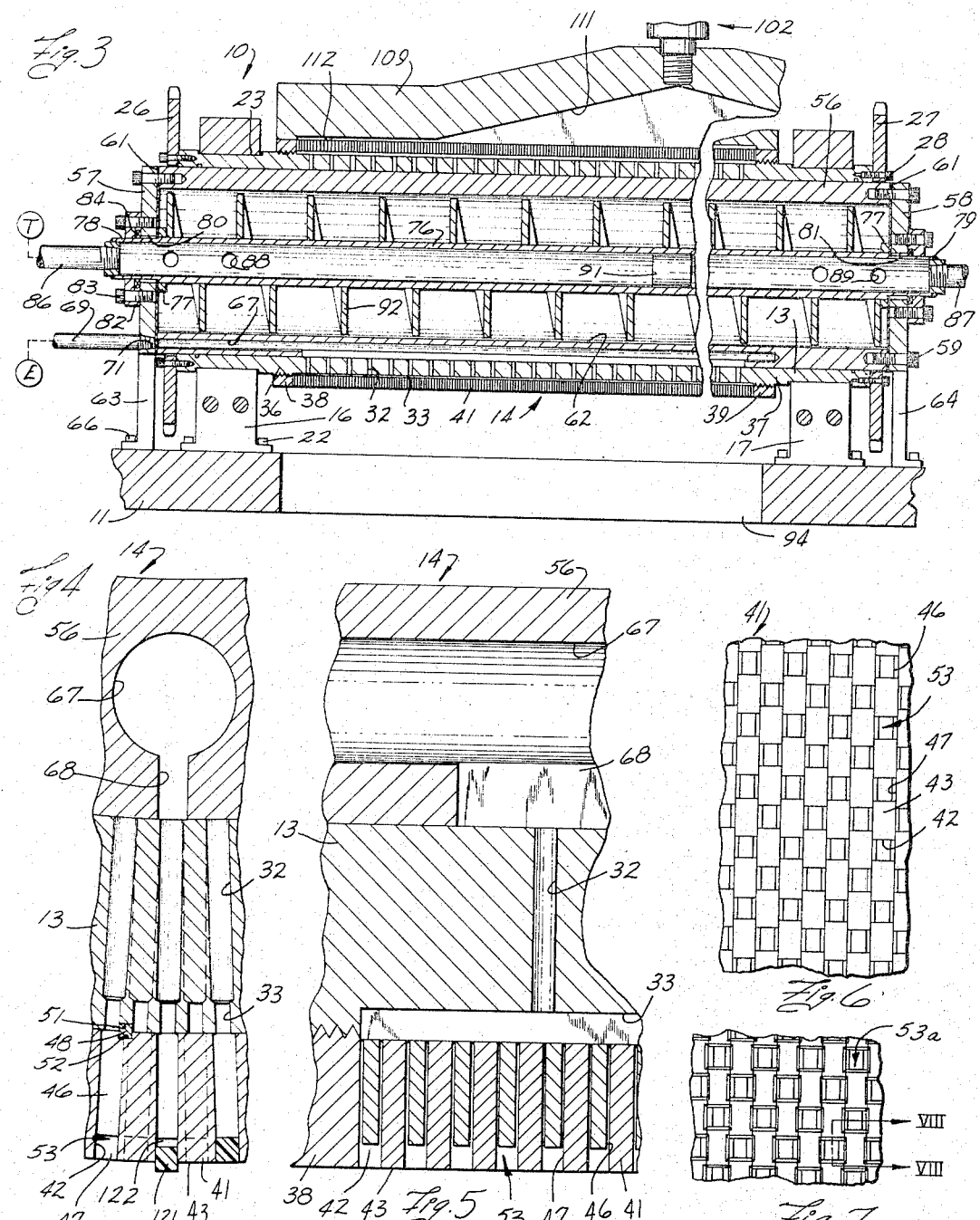

United States Patent Office 3,355,765
Patented Dec. 5, 1967

3,355,765
PELLETIZING MACHINE
James W. Hendry, Scottsburg, Ind., assignor to Borg-Warner Corporation, Chicago, Ill., a corporation of Illinois
Filed Sept. 2, 1965, Ser. No. 484,689
9 Claims. (Cl. 18—12)

This invention relates to a mechanism for making pellets of a synthetic, organic, plasticizable material and, more particularly, relates to a mechanism wherein plastic material is forced into cavities in a drum to form pellets.

Plasticizable material is generally fed to the plasticizing portion of injection molding or extrusion machines in the form of small granules or pellets of consistent size and of generally similar shapes in order to achieve a uniform plasticizing of the material. This is for the well-known reason that where the pellets differ appreciably in size, the smaller particles become plasticized while the larger ones may remain unplasticized or the smaller ones become excessively worked while the larger particles are merely reaching a plastic condition. Where the pellets differ appreciably in shape, similar, though perhaps less severe, differences in plasticizing rates occur. Thus, there is a demand for pellets which are both uniform in size and of preferably similar shape.

An early and still used method of manufacturing pellets (cutting a sheet of material into strips which are then cut crosswise) for plasticizing devices produces substantially rectangular pellets. As a result, rectangular pellets have become accepted by plasticizing machine operators and, hence, by buyers of plasticizing pellets. In some cases the use of rectangular pellets has become so habitual as to cause resistance to use of pellets of differing shapes.

However, the afore-mentioned prior art method has been found to be relatively expensive in time and/or equipment required. Thus, the present invention was developed in an attempt to produce a mechanism capable of making pellets of plasticizable material in large quantity with the required uniformity and of shape generally similar to that to which users are already accustomed.

Accordingly, the objects of the invention include:

(1) To provide a mechanism for producing pellets of plasticizable material.

(2) To provide a mechanism, as aforesaid, capable of continuously and automatically producing pellets of plasticizable material substantially constant in size and shape, such pellets being of rectangular, square or a wide variety of other forms as required.

(3) To provide a mechanism, as aforesaid, in which plasticized material is forced into a plurality of cavities in a drum and in which the material in such cavites forms pellets when ejected therefrom.

(4) To provde a mechanism, as aforesaid, which may be continuously operated for long periods of time without degradation of the output therefrom and which is capable of high output per unit time as compared with certain previously used methods.

(5) To provide a mechanism, as aforesaid, which can be made in a wide variety of sizes, which is adjustable to widely vary the number of pellets provided per unit time, and which is adaptable to produce pellets of widely varying size and shape by replacing a single subassembly thereof.

(6) To provide a mechanism, as aforesaid, which is of relatively simple construction, which may be manufactured at a relatively low cost either singly, or in large lots and which is readily installed for operation thereof.

(7) To provide a mechanism, as aforesaid, which is substantially self-cleaning while in operation, which has no dead corners in which material may build up during its operation, which continuously moves all the material fed thereinto therethrough and which is readily disassembled and cleaned.

(8) To provide a mechanism, as aforesaid, capable of being sturdily constructed for a long service life under rugged operating conditions and with little or no maintenance and which is readily maintained and operated by relatively inexperienced personnel.

Other objects and purposes of this invention will be apparent to persons acquainted with apparatus of this general type upon reading the following specification and inspecting the accompanying drawings.

In the drawings:

FIGURE 3 is a fragmentary sectional view essentially as taken on the line III—III of FIGURE 2 and is of reduced size.

FIGURE 4 is an enlarged fragment of FIGURE 2.

FIGURE 5 is an enlarged fragment of FIGURE 3.

FIGURE 6 is an enlarged fragment of FIGURE 1.

FIGURE 7 is a view similar to FIGURE 6 and showing a modification thereof.

FIGURE 8 is a fragmentary sectional view substantially as taken on the line VIII—VIII of FIGURE 7 and rotated in a clockwise direction through 90°.

Figure 1:
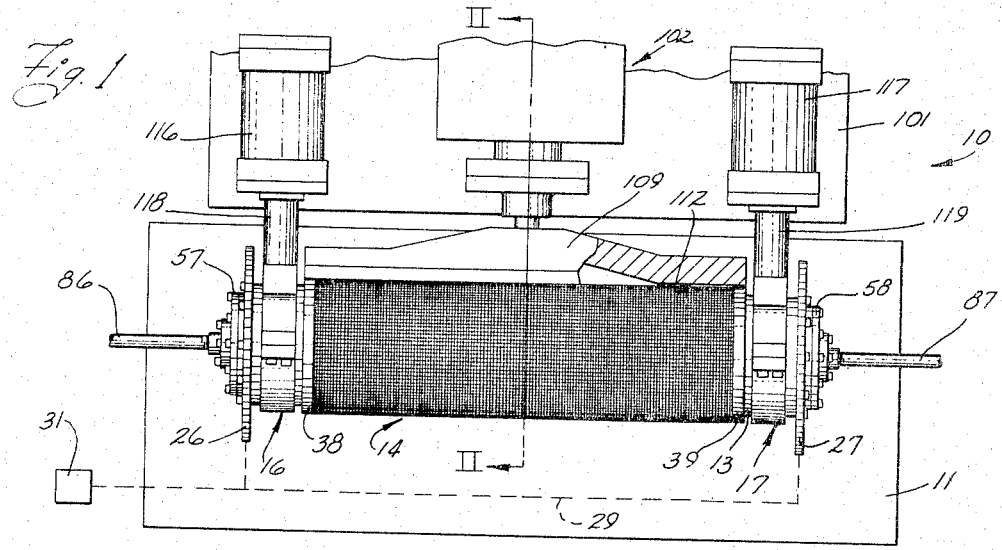
FIGURE 1 is a partially broken, fragmentary top view of a pelletizing mechanism embodying the invention.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

*General description*

In general, the objects and purposes of the invention are met by providing a mechanism for continuously producing a plurality of pellets from a supply of plasticized material. The mechanism comprises an annular drum supported for rotation about its geometric axis, the peripheral wall of said drum having a plurality of material receiving recesses opening outwardly therefrom. Passage means in the drum communicate between the recesses and the interior of the drum. A fixed extrusion manifold extends axially along the drum in slidable contact with the peripheral surface thereof. Pressure means feed plasticized material into the manifold and thence into the communicating ones of the recesses in the drum. Rotation of the drum allows the manifold to fill recesses located in successive axially extending zones on the drum. A cylindrical barrel is disposed within the drum and is fixedly supported by means outside the drum. Temperature regulating fluid, usually steam, is supplied to a central chamber within the barrel to control the temperature of the material in the drum recesses. A longitudinal groove is provided in the peripheral wall of the barrel at a location circumferentially displaced from the manifold for communication with successive ones of the passage means rotating therepast. Pressure fluid of a much lower viscosity than that of the plastic material, such as compressed air, is supplied through the groove and passage means to the recesses to eject material therefrom in the form of uniform pellets.

*Detailed description*

The mechanism 10 (FIGURES 1, 2 and 3) embodying the invention includes a preferably horizontal drum table 11. A drum unit 14 includes an elongated, circular cylindrical shell 13. Bearings 16 and 17 support the shell 13 adjacent the ends thereof in a preferably horizontal position above the table 11 for rotation about its central axis. The bearings 16 and 17 are preferably identical and, hence, a description of one thereof for purposes of illustration, will suffice for both. The bearing 16 here used is of the split type and comprises a removable cap 18 affixed to a block 19 by screws 21. The block 19 is flanged at its lower end and rests upon the table 11 to which it is secured by screws 22. Grooves 23 in the shell 13 interact with the bearings 16 and 17 for locating the sleeve 13 axially with respect to table 11. Preferably identical sprockets 26 and 27 are mounted at the ends of the shell 13 by screws 28. The sprockets 26 and 27 extend radially beyond the shell 13 and are driven, by any convenient means indicated by the broken line 29 in FIGURE 1 from a motor 31, to rotate the drum unit 14.

A plurality of preferably identical cylindrical feed openings 32 of any desired shape and size (FIGURES 2, 3, 4 and 5) extend radially through the shell 13 in a zone intermediate the bearings 16 and 17. The feed openings 32 are arranged in axially aligned rows which rows are preferably evenly distributed around the circumference of the shell 13. In the particular embodiment shown, the openings 32 in each axial row are not circumferentially aligned with the corresponding holes of the preceding or succeeding axial row. Rather the openings 32 in a given axial row are preferably evenly spaced but axially offset with respect to the openings in the preceding and succeeding rows. Moreover, the inner ends of the circumferentially aligned openings 32 in alternate axial rows are in the embodiment shown spaced from each other by substantially the diameter of an opening 32 so the inner ends of the openings in the adjacent axial rows of openings 32 are here contiguous although the outer ends of the openings 32 are not. An axial groove 33 of preferably rectangular cross section in the outer peripheral surface of shell 13 communicates with the outer ends of the openings 32 in each axial row thereof.

The shell 13 is externally threaded at the ends of the grooves 33 as indicated at 36 and 37 (FIGURE 3) between the bearings 16 and 17. The portions of the shell 13 axially beyond the portions 36 and 37 are reduced in diameter to allow annular retainers 38 and 39 to be removably threaded on the threaded portions 36 and 37, respectively. A plurality of preferably identical rings 41 snugly but slidably surround the shell 13 substantially for the length of the grooves 33. The rings 41 are pressed snugly against each other by and preferably have the same outside diameter as the retainers 38 and 39. Each ring 41 has a plurality of substantially rectangular notches 42 (FIGURES 4, 5 and 6) in the peripheral wall thereof which extend axially therethrough. The notches 42 are preferably identical and are preferably evenly spaced circumferentially in the ring 41. The notches 42 are here separated by substantially rectangular unnotched portions 43 of the ring 41, the unnotched portions 43 preferably being of greater circumferential extent than the notches 42. In the particular embodiment shown, the radial and circumferential dimensions of the notches 42 are equal to the thickness of the ring 41 which is 3/32 inch. Each notch 42 communicates at each axial end thereof with a preferably rectangular channel 46 which extends radially inwardly through the ring 41. The channels 46 are preferably the same circumferential extent as the notches 42 and are radially aligned therewith. Said channels 46 are relatively shallow, such as 0.003 inch in depth, such that when the open side of each thereof is closed as hereinafter described to form a rectangular passageway, said passageway will permit passage therethrough of the low viscosity ejection fluid but will not permit entry thereinto under the discharge pressure of the extruder of the relatively high viscosity plastic material. It will be evident, therefore, that the depth of the channels 46 and the discharge pressure of the extruder will be functions of each other and both are functions of the viscosity of the plastic material at its molding temperature.

Alternating ones of the ring 41 are preferably circumferentially displaced with respect to each other on the shell 13 so that each notch 42 is circumferentially centered on an unnotched portion 43 of the ring on either side thereof as shown in FIGURE 6.

The axial ends of each notch 42 are closed by the radial wall 47 of the adjacent unnotched portion 43 on the surrounding rings 41, which radial walls 47 also cover the otherwise open side of the channels 46 leading to said notch. Each of the notches 42 thus axially closed defines a rectangular, and in the particular embodiment shown a square, radially outwardly facing recess 53. Each channel 46 is radially aligned with one of the grooves 33 in the shell 13 when the rings 41 are correctly placed thereon. Any convenient means may be used to prevent circumferential shifting of the rings 41 with respect to each other and with respect to the grooves 33 in the shell 13. In the particular embodiment shown, an axially elongated key 48 (FIGURE 4) preferably the length of the grooves 33, is disposed in an axial keyway 51 in the peripheral wall of the shell 13 and in a cooperating axially aligned set of keyways 52 in the radially inner edges of succeeding rings 41 to maintain the afore-mentioned circumferential alignment between the rings 41 and the shell 13. The keyway 51 preferably lies between a pair of grooves 33 in the shell 13 and the set of keyways 52 preferably passes substantially along the circumferentially adjacent edges of channels 46 in adjacent rings 41 in a manner to minimize blocking of the channels 46 by the key 48. Although communication through the wall of the drum unit 14 is preferably established through the openings 32 and grooves 33 in the shell 13 and channels 46 and recesses 53 in rings 41 separate from the shell 13 as above described, it is contemplated that, at least within the broadest aspects of the invention, such communication may be established by other arrangements of passageways and manifolds.

An elongated annular and cylindrical barrel 56 (FIGURE 3) is snugly disposed within the shell 13 with sufficient clearance as to allow rotation of the shell with respect thereto. The barrel 56 extends axially beyond the sprockets 26 and 27. End plates 57 and 58 close the ends of the barrel 56 and are secured thereto by any convenient means such as the screws 59. Gaskets, one of which is shown at 61, are preferably disposed between the end plates 57 and 58 and the barrel 56 to prevent leakage out of the central chamber 62 of the barrel 56. The end plates 57 and 58 have depending portions 63 and 64, respectively, which are secured to the drum table 11 by means such as screws 66. Thus, the end plates 57 and 58 support the barrel 56 on the drum table 11.

A pressure fluid passage 67 (FIGURES 3 and 4) extends axially along and within the wall of the barrel 56 from the leftward end thereof to a point to the right of the rings 41 on the shell 13. The pressure fluid passage 67 is preferably located directly beneath the center of said barrel 56. A pressure fluid slot 68 extends radially outwardly (here downwardly) from the pressure fluid passage 67 through the periphery of the barrel 56. The slot 68 extends through the same axial zone as the openings 32 in the shell 13. The circumferential width of the slot 68 is preferably slightly greater than the diameter of the openings 32 so that the slot will always be in communication with more than one axial row of openings 32. The end plate 57 and the adjacent gasket 61 have openings therethrough, as indicated at 71, coaxial with the leftward end of the passage 67 in which a conduit or pipe 69 is preferably threadably engaged. The conduit 69 connects to a suitable source E of fluid under pressure such as air or steam, for expelling the contents of the recesses 53 therefrom.

A temperature control tube 76 (FIGURES 2 and 3) extends substantially coaxially through the barrel 56. Annular stop members 77 are secured adjacent each end of the tube 76 by any convenient means such as welding. The stop members 77 snugly contact the gaskets 61 disposed off the end plates 57 and 58 to axially locate the tube 76 with respect to the barrel 56. The ends 78 and 79 of the tube 76 beyond the stop members 77 are slightly reduced in diameter for preferably loose reception through coaxial openings 80 and 81 in the end plates 57 and 58, respectively. A packing ring 82 is fixed to the axially outer face of each of the end plates 57 and 58 by any convenient means such as screws 83. The packing rings 82 snugly surround the tube ends 78 and 79 and hold packing 84 securely thereagainst for preventing leakage therepast out of the central chamber 62 of the barrel 56.

The end 78 of the tube 76 is connected through a supply conduit 86 to a suitable source T which may be energized to supply, if desired, temperature controlling fluid. The temperature controlling fluid may be of any desired type and may be heated or cooled by the source T. For example, steam may be used as a temperature controlling fluid for maintaining the temperature of the barrel 56 and hence, the drum 14 at a constant elevated temperature. The rightward end of the tube 76 connects to an exhaust conduit 87 which may exhaust to the atmosphere or may return to the source T as desired. Sets of openings 88 and 89 adjacent the leftward and rightward ends, respectively, of the tube 76 to allow communication thereof with the chamber 62. The tube 76 preferably is provided with an internal plug 91 between sets of openings 88 and 89. A baffle 92 is affixed to the exterior of the tube 76 and extends outwardly therefrom into adjacency with the interior surface of the barrel 56. In the particular embodiment shown, the baffle 92 comprises a radially extending flange which is helically wound along the tube 76 between the stop members 77. Thus, steam or other temperature controlling fluid entering the tube 76 passes through the openings 88 into the central chamber 62, travels rightwardly along the helical baffle 92 and passes inwardly through the openings 89 and the rightward end of the tube 76 into the exhaust conduit 87.

A substantially rectangular hole 94 (FIGURES 2 and 3) extend through the drum table 11 below the pressure fluid slot 68 in the barrel 56. The hole 94 is sufficiently large as to allow free passage therethrough of material ejected from the afore-mentioned recesses 53.

A base 101 (FIGURES 1 and 2) is transversely spaced from the table 11. The base 101 supports a plasticizing machine 102 of any desired type, here including a plasticizing screw 103. The screw 103 when rotated forces plasticized material leftwardly (FIGURE 2) through openings in a transfer member 104 into an elongated sprue opening 106. If desired, of course, other means such as a reciprocable ram might be employed to force material into the sprue 106. The common central axis of the screw 103 and sprue 106 preferably perpendicularly bisects the drum unit 14. An elongated manifold 109 parallels the central axis of the drum unit 14 and snugly but slideably engages the periphery thereof between the axially outer ends of the retaining rings 38 and 39. In the particular preferred embodiment shown, the manifold 109 and screw 103 extend horizontally from the drum unit 14. Hence, the manifold 109 contacts the surface of the drum unit 14 the location thereon circumferentially spaced from the pressure fluid slot 68 in the barrel 56.

The sprue opening 106 communicates with chamber 111 (FIGURES 2 and 3) in the manifold 109 which chamber 111 is divergent axially of the barrel 56 and has ends 112 of relatively small radial extent. The circumferential thickness of the chamber 111 is preferably constant throughout its axial length and is preferably comparable to or slightly greater than the circumferential extent of the recesses 53 in the drum unit 14. The interior configuration of the manifold 109 provides a substantially even distribution of plasticized material throughout its axial length for uniformly charging all of the recesses 53 rotated therepast.

A pair of pressure fluid cylinders 116 and 117 (FIGURES 1 and 2) are mounted on the base 101 flanking the plasticizing machine 102. The central axes of the pressure fluid cylinders 116 and 117 are parallel to and coplanar with the horizontal central axis of the manifold 109 and, hence, are perpendicular to and coplanar with the central axis of the drum unit 14. The cylinders 116 and 117 have piston rods 118 and 119, respectively, which are affixed by any convenient means such as welding to the blocks 19 of the bearings 16 and 17, respectively. Thus, retraction of the piston rods 118 and 119 of the pressure fluid cylinders 116 and 117 moves the bearings 16 and 17, drum table 11, drum unit 14 and barrel 56 as a unit against the manifold 109.

*Operation*

Although the operation of the mechanism 10 embodying the invention has been indicated to some extent hereinabove, the same will be reviewed to insure a more complete understanding of the invention.

Figure 2:
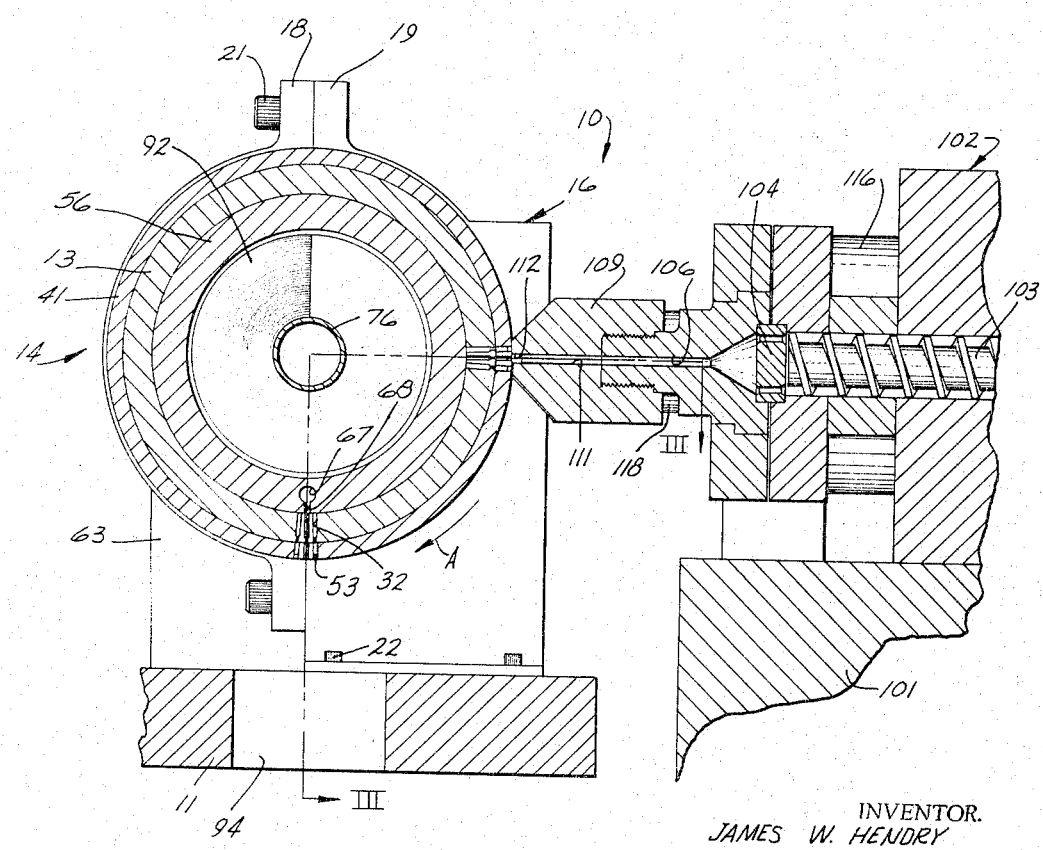
FIGURE 2 is an enlarged sectional view essentially as taken on the line II—II of FIGURE 1.

The sequence of the operation of the mechanism 19 may be started by energizing the motor 31 to continuously rotate the drum unit 14 through sprockets 26 and 27 at a fixed speed in a direction to move successive axial rows of recesses 53 past the manifold 109 and downwardly therefrom past the pressure fluid slot 68 of the barrel 56, such direction in this embodiment being clockwise as indicated by the arrow A in FIGURE 2. The plasticizing machine 102 is fed plasticizable material which the screw 103 plasticizes and forces under pressure through the breaker plate 104 and discharge opening 106 into the chamber 111 to the ends 112 thereof. The pressure exerted on the plasticized material forces same into each succeeding axial row of recesses 53 presented by the rotating drum unit 14 to the chamber 111. The shape of the chamber 111 is such that the pressure exerted on material entering the recesses 53 is substantially the same throughout the length of an axial row thereof. The rate of rotation of the drum unit 14 is sufficiently slow and the pressure on the material is sufficiently high as to allow a complete filling of each recess 53 as it passes the chamber 111. The channels 46 are narrow enough (e.g. .003 inch) that material of a relatively wide range of viscosities pushed into the communicating recesses 53 under a relatively wide range of pressures will not enter the channels 46.

In the particular embodiment shown, the chamber 111 of the manifold 109 will constantly be in communication with at least one axial row of recesses 53 to assure an uninterrupted flow of material through the sprue 106 and chamber 111 thereby minimizing vibration, pulsing or other deleterious effects which might result from periodic disconnection of the chamber 111 from the rows of recesses 53.

If desired, as material is fed to the drum unit 14, temperature controlling fluid, such as steam, may be fed from the source T through the conduit 86 and chamber 62 to heat the barrel 56 and drum unit 14 to a constant elevated temperature thereby preventing the materials disposed in the recesses 53 from cooling and/or hardening excessively in the recesses 53. It is fully contemplated, however, that in certain cases, it may be desirable to accelerate the cooling of the material in the recesses 53 rather than preserving the heat thereof and such may be accomplished by using a cold temperature controlling fluid, such as cold water or a refrigerated liquid rather than steam as above described.

The pressure fluid slot 68 is supplied with a fluid under pressure, usually compressed air, from the source E via the conduit 69 and pressure fluid passage 67. In the particular embodiment shown, the slot 68 communicates at all times with at least one axial row of openings 32 in the shell 13 to allow a continuous and uninterrupted flow of air through the slot 68 and, hence, minimize vibration or other deleterious effects. Pressure fluid from the slot 68 passes through the openings 32 to the communicating one or ones of the grooves 33. The even spacing of the openings 32 assures substantially the same pressure at any point along a given groove 33. Pressure fluid in a groove 33 feeds the communicating axial row of channels 46 which travels therethrough to the radially inner, axial edges of the communicating recesses 53. Pressure fluid entering each recess 53 forms a continuously expanding bubble 122 (FIGURE 4) behind the plug or pellet 121 of plasticizable material located therewithin which forces the plug 121 out of the recess 53, the plug 121 thereafter dropping from the rotating drum unit 14 through the hole 94 in the table 11. Depending on the plasticized material involved, the plug 121, for example, may fall directly into a suitable storage receptacle or alternatively, the plug 121 might fall for example, through an air stream or into a tank of water to hasten solidification thereof. The rows of recesses 53 thus emptied by pressure fluid from the slot 68 continue their rotation therepast on the drum unit 14 and upon completion of a revolution of the drum unit 14 are presented again to the manifold 109 for refilling.

The mechanism 10 hereinabove described is substantially free of pockets where plasticized material can collect and harden and continuous operation of the mechanism normally need not be interrupted for cleaning. Moreover, the drum unit 14 is substantially self-cleaning during its operation in that the only portion thereof occupied by plasticizable material, namely, the recesses 53, are effectively purged of all plasticized material by the pressure fluid stream forced therethrough for ejecting the pellets 121. With the ejection of the pellet 121 from the recess 53 ejecting fluid compressed therebehind will pass through the recess 53 at a relatively high velocity thereby tending to entrain and carry away any traces of plasticizable material which might be left in the recess 53. In shutting off the machine after making a batch of pellets 121, the screw 103 is first stopped and if desired may be reversed, to relieve the pressure on material in the manifold 109. After all the recesses 53 have been cleared of pellets 121, the motor 31 and the flow of pressure fluid from the source E may be stopped. If desired, the discharge of air through the slot 68 and rotation of the drum unit 14 may be continued after the recesses 53 have lost their pellets 121 to more adequately insure cleaning the recesses 53 when the plastic material has an increased tendency toward adhesion. In general, therefore, no further cleaning of the drum unit 14 is required after the mechanism 10 is stopped even prior to a long inoperative period or after use of materials which deteriorate in time or are corrosive. The manifold 109 and plasticizing machine 102 may be cleaned after use in a conventional manner, cleaning of the chamber 111 being facilitated by extension of the piston rods 118 and 119 for spacing the drum unit 14 from the manifold 109.

Should it be desired, for example, after extended periods of use with particularly adhesive plasticized material, the recesses 53 may be given an additional cleaning by removing the rings 41 from the shell 13. Such may be accomplished by removal of the drum unit 14 from the bearings 16 and 17 and removal of the end plate 57, sprocket 26 and retaining ring 38 as well as the conduits 69 and 86 to allow the rings 41 to be removed from the shell 13. Thereafter, the notches 42 may be readily cleaned as by axially brushing thereof or the like. If desired, several rings may be cleaned simultaneously if arranged with the notches 42 thereof axially and continuously aligned. Reassembly of the ring on the shell 13 accomplished by reversing the above described disassembly thereof.

Modification

Should pellets having sloped sides be desired, the circumferentially spaced sidewalls of the recesses 53 may be inclined with respect to each other for forming an outwardly divergent angle as shown in FIGURE 7. Moreover, the axial end walls 47 of the recesses 53 may, if desired, be outwardly divergently sloped as indicated in FIGURE 8 thereby producing, when both axial and circumferential walls are sloped a pellet shaped as a four-sided truncated pyramid.

Although a particular preferred embodiment of the invention has been disclosed hereinabove for illustrative purposes, it will be understood that variations or modifications thereof which lie within the scope of the appended claims are fully contemplated.

The embodiments of the invention in which an exclusive property or privilege is claimed are defined as follows.

1. In a pelletizing machine for making pellets from plasticized material, the combination comprising:
   an elongated cylindrical member having a multiplicity of axially and circumferentially spaced, pellet-forming openings therein, said openings being arranged in a zone which extends for a substantial portion of the length of said cylindrical member, said cylindrical member having wall means defining a stationary bottom wall for each opening and having passage means communicating with each opening adjacent the bottom wall thereof, said passage means including portions adjacent each opening which portions are of reduced size so that the plasticized material cannot enter thereinto;
   means for rotatably supporting said cylindrical member;
   elongated manifold means disposed closely adjacent said cylindrical member and having an internal chamber extending at least the entire length of said zone and communicating with the openings in a portion of limited circumferential extent of said cylindrical member;
   extrusion means communicating with said internal chamber for forcing plasticized material through said internal chamber and into said openings in said cylindrical member;
   fluid supply means circumferentially displaced from said manifold means and communicating with said cylindrical member for supplying ejection fluid under pressure to said passage means and thence to said openings to eject the pellets from said openings, said portions of said passage means being of sufficient size to permit the flow of ejection fluid therethrough into said openings.

2. The machine defined in claim 1 wherein said openings each includes a radially inner portion and at least one radially outer portion of cross sectional area substantially greater than that of said inner portion, said inner portion being sufficiently small in view of the viscosity of the plastic material at its molding temperature, that the material will not be forced thereinto under the operating pressure of the extrusion means but sufficiently large that sufficient of an ejection fluid of relatively low viscosity will pass therethrough under the available fluid pressure to discharge material from said outer portion.

3. The machine defined in claim 1 wherein each of said openings comprises a substantially rectangular, radially outer portion and at least one radially inner portion communicating therewith and having a reduced width for preventing entrance of plastic material thereinto.

4. The machine defined in claim 1 including constant pressure means for constantly urging said manifold means and said cylindrical member to move toward and against each other to provide a constant contact pressure therebetween which is substantially uniform therealong.

5. The machine defined in claim 1, in which said fluid supply means comprises:

an annular member disposed within said cylindrical member and fixed with respect to the axis of rotation of said cylindrical member, said annular member including a passage for conducting a fluid under pressure therethrough, and an elongated slot extending the length of said zone and extending from said passage through the peripheral wall of said annular member for communication with said passage means in said cylindrical member;

whereby material forced into said openings from said internal chamber will be ejected therefrom by fluid pressure as said cylindrical member rotates said openings past said slot.

6. The machine defined in claim 5 wherein said means for supporting said cylindrical member for rotation comprises a pair of bearings disposed adjacent the axial ends thereof; and including
a pair of pressure fluid cylinders having first portions fixed with respect to said manifold means and having second portions extendable and retractable with respect to said first portions and fixed with respect to said bearings whereby said pressure fluid cylinders are actuable to urge said cylindrical member against said manifold means.

7. The machine defined in claim 5 wherein the ends of said annular member are closed and means are provided for supplying a temperature controlling fluid to the interior of said annular member and further means are provided for assisting in uniformly distributing said temperature controlling fluid within said annular member for controlling the temperature thereof.

8. The machine defined in claim 5 wherein said internal chamber has a central portion which is substantially triangular shaped and diverges in a direction away from said extrusion means towards said cylindrical member, the axial end portions of said internal chamber being of substantially constant and reduced extent radially of said cylindrical member whereby the pressure exerted on material in said internal chamber by said extrusion means is substantially constant along the axial length of said internal chamber adjacent the radially inner edge thereof to promote even filling of the openings along the axial length of said cylindrical member.

9. In a drum unit for a pelletizing machine capable of making pellets from plasticized material, the combination comprising:
an axially elongated shell having a plurality of circumferentially spaced, axially extending, outwardly opening grooves in the periphery thereof and having a plurality of openings in communication with each groove and extending radially inwardly therefrom;
a plurality of substantially identical rings snugly disposed on the periphery of said shell between a spaced pair of annular retainers fixed with respect to said shell, each of said rings having a plurality of circumferentially evenly spaced, outwardly opening notches extending axially therethrough and a radial channel extending radially inwardly from at least one axial end of each notch, the circumferential length of the portions of each ring between said notches being greater than the circumferential length of said notches; and
means for circumferentially fixing said rings with respect to said shell such that the axial ends of each notch are closed by portions between notches on the preceding and succeeding rings and so that each of said channels communicates at its inner end with one of said grooves in the periphery of said sleeve;
whereby material deposited in said notches may be ejected therefrom by pressure fluid entering said openings in said shell, passing through said grooves and to said notches.

References Cited

UNITED STATES PATENTS

| | | | |
|---|---|---|---|
| 1,221,878 | 4/1917 | Lovejoy | 25—77 |
| 2,031,387 | 2/1936 | Schwarz. | |
| 2,083,557 | 6/1937 | Crane et al. | |
| 2,208,536 | 7/1940 | Brown | 18—39 |
| 2,525,135 | 10/1950 | Huff | 18—21 |
| 2,666,229 | 1/1954 | Vogt | 18—21 X |
| 2,708,287 | 5/1955 | Long et al. | 18—21 X |
| 2,757,621 | 8/1956 | Johnson | 18—12 X |
| 2,764,952 | 10/1956 | Meakin | 18—12 X |
| 2,798,253 | 7/1957 | Rhodes | 18—12 |
| 2,799,048 | 7/1957 | Stirn et al. | 18—21 |
| 2,820,249 | 8/1958 | Colombo | 18—12 X |
| 2,902,949 | 9/1959 | Meakin | 18—12 X |
| 2,958,099 | 11/1960 | Chrisholm et al. | 18—12 |
| 3,009,413 | 11/1961 | Alexander et al. | 18—12 X |
| 3,071,812 | 1/1963 | Miller | 18—21 |
| 3,089,191 | 5/1963 | Conrad | 18—21 |
| 3,101,510 | 8/1963 | Packham | 18—12 |
| 3,173,177 | 3/1965 | Rybka. | |
| 3,226,458 | 12/1965 | Graff et al. | 18—21 X |

FOREIGN PATENTS

| | | |
|---|---|---|
| 212,297 | 7/1957 | Australia. |
| 870,597 | 6/1961 | Great Britain. |

WILLIAM J. STEPHENSON, *Primary Examiner.*